United States Patent Office 2,810,763
Patented Oct. 22, 1957

2,810,763
ALKYL-SUBSTITUTED ACROLEINS

David James Hadley, Epsom Downs, and Reginald Harold Hall and David Ian Hutchinson Jacobs, Carshalton, England, assignors to The Distillers Company Limited, Edinburgh, Scotland, a British company No Drawing. Application March 13, 1950, Serial No. 149,462

Claims priority, application Great Britain March 25, 1949

6 Claims. (Cl. 260—604)

The present invention relates to hitherto unknown unsaturated aldehydes which are isomers and to their manufacture by the oxidation of two isomeric olefines. It relates, furthermore, to a simple method for the preparation of compounds which up to the present were only accessible by circuitous and therefore uneconomical methods and, in addition, to novel derivatives of said isomeric unsaturated aldehydes.

The isomeric unsaturated aldehydes are alpha-neopentyl-acrolein having the formula—

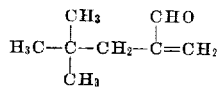

and alpha-methyl-beta-tertiary-butyl-acrolein having the formula—

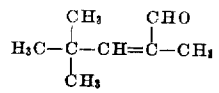

Alpha-neopentyl-acrolein has a boiling point of 146° to 147° C. at 760 mm. Hg and a refractive index $n_D^{20}$ 1.436. It forms a 2:4-dinitrophenylhydrazone with a melting point 163° C. and a semicarbazone melting point 205° C.

The isomeric alpha-methyl beta-tertiary-butyl-acrolein is a colourless liquid with a boiling point 162° to 163° C. at 760 mm. Hg and 77° to 77.5° C. at 46 mm. Hg. The refractive index is $n_D^{20}$ 1.453. The 2:4-dinitrophenylhydrazone has a melting point 203° to 204° C. The alpha-neopentyl-acrolein is a derivative of alpha-di-isobutene (2:4:4-trimethyl-pent-1-ene), whilst the alpha-methyl beta-tertiary-butyl acrolein is derived from beta di-isobutene (2:4:4-trimethyl-pent-2-ene) and it is a feature of this invention to produce them by reacting the said alpha di-isobutene or beta-di-isobutene in the vapour phase with molecular oxygen at elevated temperatures in the presence in the reaction zone of elementary selenium and a solid oxidation catalyst containing one or more of the following substances: cooper, the oxides of copper and copper compounds such as the aluminate, chromate, chromite, chloride, molybdate, sulphate, tungstate and vanadate.

Alpha di-isobutene and beta di-isobutene are contained in commercial di-isobutene and the individual isomers can be obtained, for example, by fractional distillation of the commercial product either at ordinary or reduced pressure.

When one of the individual isomers is subjected to oxidation in the described manner it has been found that isomerisation occurs and that the resulting reaction product contains both the corresponding unsaturated aldehyde and a certain amount of the isomeric aldehyde. It is, therefore, a further feature of the present invention to produce the mixture of said unsaturated aldehydes by reacting commercial di-isobutene in the vapour phase with molecular oxygen in the presence of elementary selenium and a solid oxidation catalyst as described above. The mixture of the two aldehydes resulting from the oxidation reaction may then be separated into individual isomeric aldehydes by fractional distillation, either at ordinary or reduced pressure. During the oxidation process a small proportion of methacrolein may also be formed.

In the following description and claims the expression "di-isobutene" refers to alpha di-isobutene, that is 2:4:4-trimethyl-pent-1-ene; beta di-isobutene, that is 2:4:4-trimethyl-pent-2-ene; or mixtures of these isomers such as occur in commercial di-isobutene.

The temperatures at which the reaction is conveniently effected is between 200 and 400° C. preferably between 250° and 350° C. The copper-containing contact materials are advantageously distributed on suitable supports.

The presence in the reaction zone of elementary selenium may be achieved by the addition of elementary selenium powder mixed with the copper-containing contact material or by mixing with the other material a selenide of a metal which under the reaction conditions decomposes with liberation of elementary selenium. Suitable selenides are, for instance, silver selenide, cobalt selenide and antimony selenide. It is preferred, however, to provide for the presence of elementary selenium in the reaction zone by adding selenium vapour to the gas mixture containing di-isobutene and free oxygen before the mixture is passed over the solid contact material.

It is desirable to keep the composition of the mixture of the di-isobutene with molecular oxygen containing gases such as air outside the explosion limits either by restricting the oxygen concentration, or by keeping the di-isobutene content sufficiently low or so high that even after oxidation of a part thereof has taken place the di-isobutene content is still above the upper explosion limit. Diluents such as carbon dioxide, steam or other inert gases or vapours may be added to the gaseous reaction mixture.

In order to recover the unsaturated aldehyde from the gaseous mixture coming from the reaction zone the mixture may be passed first through a water-cooled condenser by which part of the reaction product is removed and may then be scrubbed with a suitable solvent such as light mineral oils, high or medium boiling hydrocarbons, alcohols or other inert solvents. Alternatively, it may be cooled to a low temperature such as below minus 40° C. whereby the unsaturated aldehydes are condensed or it may be passed over activated carbon.

It has further been found that the alpha-neopentyl acrolein and the alpha-methyl-beta-tertiary-butyl-acrolein either individually or in admixture can be completely hydrogenated, for instance by reacting them with an excess of hydrogen in the presence of a hydrogenation catalyst, such as Raney nickel or copper. In both cases the same saturated alcohol, 2:4:4-trimethyl-pentan-1-ol is formed. The catalytic hydrogenation may be carried out in the gaseous or in the liquid phase.

The saturated alcohol 2:4:4-trimethyl-pentan-1-ol has hitherto been prepared by circuitous and expensive methods such as by reacting alpha-neopentyl propionyl chloride with tertiary butyl magnesium chloride or by reduction of the ethyl ester of 2:4:4-trimethyl-pentanoic acid with sodium (J. A. C. S., 1941, vol. 63, pages 643–655). The present invention therefore provides a cheap and economical method for the production of this valuable alcohol with 8 carbon atoms.

When the unsaturated aldehydes alpha-neopentyl-acrolein and alpha-methyl beta-tertiary-butyl-acrolein are subjected to hydrogenation under such conditions that only the double bond between two carbon atoms is saturated whilst the aldehyde group is either not reduced at all or is only partly attacked, for example, by working in the presence of a hydrogenation catalyst with a hydrogen input which is substantially restricted to that required by theory i. e. one molecule of hydrogen to one molecule of unsaturated aldehyde it is possible to convert both unsaturated aldehydes into the same saturated aldehyde 2:4:4-trimethylpentanal.

Instead of isolating and/or separating the unsaturated aldehydes alpha-neopentyl-acrolein and alpha-methyl beta-tertiary-butyl-acrolein before they are subjected to the complete or partial hydrogenation process for the preparation of the saturated alcohol or the 2:4:4-trimethylpentanal respectively, the reaction mixture issuing from the reactors may be subjected to the said hydrogenation process after removal of unreacted di-isobutene and preferably after removal of methacrolein which has also been formed, which latter may be effected by washing with water.

The 2:4:4-trimethylpentanal in its turn can be oxidised, for instance, by means of silver oxide, or preferably, with molecular oxygen to the 2:4:4-trimethyl-pentanoic acid. Thus, according to the present invention this acid which hitherto was available from di-isobutene only by oxidation with chromic acid and which in the form of its heavy metal salts is a valuable drier in lacquers, can be prepared in a cheap and simple manner.

The fact that 2:4:4-trimethylpentan-1-ol as well as 2:4:4-trimethylpentanal may be prepared from both neopentyl-acrolein and methyl-tertiary-butyl-acrolein makes it possible to manufacture the said saturated alcohol or aldehyde direct from commercial di-isobutene without isolating the two isomeric olefines or after oxidation without separating the two unsaturated aldehydes, by oxidising the commercial di-isobutene in accordance with the process of this invention and subjecting the mixture of alpha neopentyl-acrolein and alpha methyl-beta-tertiary-butyl-acrolein produced thereby to partial hydrogenation and/or further oxidation respectively.

It is a further feature of this invention to oxidise the hitherto unknown aldehydes alpha-neopentyl-acrolein and alpha-methyl beta-tertiary-butyl-acrolein by means of, for instance, silver oxide, or preferably, with molecular oxygen in the liquid phase at temperatures below 100° C. advantageously at room temperature, whereby the corresponding acids, namely alpha-neopentyl-acrylic acid and 2:4:4-trimethylpent-2-enoic acid respectively are formed. Neither acid has been described before. The neopentyl-acrylic acid melts at 44° C. and has a boiling point of 110° C. at 10 mm. Hg. Its methyl ester boils at 95° C./70 mm. Hg. Its para-bromo-phenacyl ester melts at 56° C. The esters of acrylic acid, being alpha-substituted derivatives thereof, are valuable starting materials for plastic polymers. The 2:4:4-trimethylpent-2-enoic acid has a boiling point of 123° C. at 15 mm. Hg and a refractive index $n_D^{20}$ of 1.4550. The para-bromophenacyl ester of this acid crystallises from 90% ethanol in sheaves of thin white needles which have a melting point of 79–80° C. On hydrogenation of the free acids or their esters in the usual way the above-named trimethyl-pentanoic acid or its esters respectively are formed.

The following diagram shows the formulae of the compounds which form the object of the present invention and the reactions leading thereto. The novel compounds are underlined:

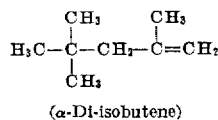
(α-Di-isobutene)

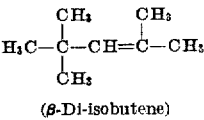
(β-Di-isobutene)

 

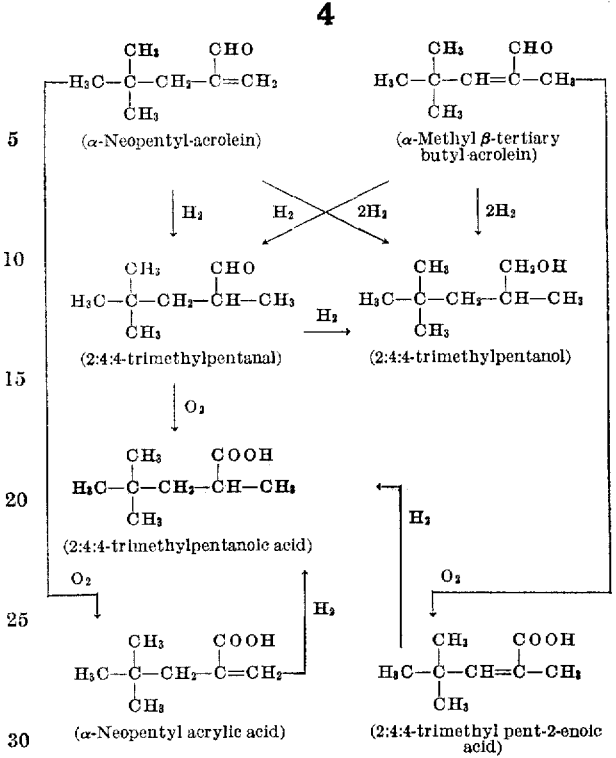

The following examples illustrate the manner in which the process of the invention may be carried out in practice and the products resulting from said processes obtained.

*Example 1.—Alpha-neopentyl-acrolein*

100 grm. activated alumina of 8–16 mesh was heated to 80° C. and mixed with a solution, also heated to 80° C., of 200 grm. Cu(NO$_3$)$_2$.3H$_2$O in 80 cc. water. The mixture was maintained at 80° C. for ¼ hour and the excess liquid was then drained off. The impregnated alumina was dried at 100° C. for 12 hours. It was then heated in a stream of air, first at 450° C. until nitrogen oxides ceased to be evolved, and then at 850° C. for 1½ hours, by which treatment a substantial proportion was converted into copper aluminate.

8 grm. of this catalyst was placed in a helical reactor of Pyrex (registered trademark) glass of 6 mm. bore, which was heated at 275° C. in a liquid bath.

A 10 litre per hour stream of air was passed through a reservoir of 2:4:4-trimethylpent-1-ene maintained at such a temperature that 2 grm. per hour was evaporated. The gas then passed over the surface of a pool of metallic selenium of such a size and at such a temperature that approximately 0.02 grm. per hour was evaporated and then entered the catalyst bed. The reacted gases were conducted through a vessel cooled in a bath of acetone and solid CO$_2$.

The crude product from the cold trap was separated by distillation into the following fractions:

Distillation range:
Up to 85° C., containing alpha methyl-acrolein
85–125°., largely unchanged 2:4:4-trimethylpent-1-ene.
125–147° C., containing C$_8$ carbonyl compound
Above 147° C.

The 125–147° C. fraction was redistilled and yielded a liquid, boiling at 146° C. whose unsaturation and carbonyl value corresponded to the formula C$_8$H$_{14}$O.

This aldehyde was reacted with silver oxide, giving an unsaturated acid which, in its turn, was catalytically hydrogenated with Adam's catalyst at normal temperature to the corresponding saturated acid, 2:4:4-trimethyl pentanoic acid.

Example 2.—2:4:4-trimethylpentan-1-ol

The fraction boiling between 146–147° C., which was isolated from the oxidation products of di-isobutene, was treated with Raney nickel in order to remove traces of selenium, filtered from the catalyst, and after the addition of fresh Raney nickel the filtrate was treated with hydrogen at room temperature, till no further absorption of hydrogen occurred and the product was free from aldehyde. After the removal of the catalyst the product was distilled and consisted of pure 2:4:4-trimethylpentan-1-ol. In a second hydrogenation, the temperature was maintained at 55° C. The aldehyde was dissolved in ethanol and pretreated with Raney nickel to remove inhibitors from the aldehyde. The yield of pure saturated alcohol was high and the rate of hydrogen absorption was 25 litres of hydrogen per hour and litre reaction volume. The 2:4:4-trimethylpentan-1-ol had a boiling point of 68–69° C. at 12 mm. and a refractive index $n_D^{20}$ of 1.4257–1.4263.

Example 3.—2:4:4-trimethylpentanal

Alpha-neopentyl acrolein was hydrogenated in ethanol solution in the presence of Raney nickel at atmospheric temperature and pressure, until slightly more than one mol. of hydrogen per mol. of aldehyde had been absorbed. The products were isolated by fractional distillation and 2:4:4-trimethylpentanal was obtained as a colourless liquid, boiling point 39° C. at 9 mm. mercury, $n_D^{20}$ of 1.4155.

Example 4

10 litres per hour of air was passed through a reservoir charged with commercial diisobutene maintained at such a temperature that 2 grm. per hour was evaporated. The gas mixture was then passed over a pool of elementary selenium the surface of which measured 6 cm.² at a temperature of about 275° C. in a liquid bath, and so that the gas mixture was charged with approximately 0.025 grm. per hour. The equipment for carrying out the reaction, and the solid contact material with its preparation were similar to those described in Example 1. The resulting reaction mixture coming from the reaction zone was passed first through a water cooled condenser by which part of the reaction products was removed, and then scrubbed with a light mineral oil which acted as a solvent. Instead of scrubbing the gas mixture may also be cooled below minus 40° C. The condensate was then separated into its components by fractional distillation. The distillate passing over between 85° and 130° C. consisted largely of di-isobutene. The fraction distilling between 125° and 165° C. was then redistilled and separated into two fractions, one boiling at 146° to 147° C. at atmospheric pressure and consisting of alpha-neopentyl acrolein, and the other boiling at 162° to 163° C. at atmospheric pressure and consisting of alpha-methyl beta-tertiary-butyl-acrolein.

Example 5.—Alpha-neopentyl acrylic acid

Alpha-neopentyl acrolein was vigorously stirred in a flask cooled to 15° C. and a slow stream of oxygen was passed through the liquid. The introduction of oxygen was continued for 20 hours after which the reaction mixture was distilled.

26% by weight of the alpha neopentyl acrolein was converted to alpha-neopentyl acrylic acid with a melting point of 37° C. and a boiling point of 105–115° C./10 mm. Hg. 8% was converted to acids of lower boiling point whilst 43% was recovered unchanged.

When this acid was catalytically hydrogenated with Adam's platinum catalyst at normal temperature the corresponding saturated acid, 2:4:4-trimethyl pentanoic acid is obtained.

Example 6.—2:4:4-trimethyl pentenoic acid (alpha-methyl tertiary-butyl acrylic acid)

A solution of 6 parts by weight of sodium hydroxide in 300 parts of water was added to a mixture of 5 parts of alpha-methyl beta-tertiary-butyl-acrolein and a suspension of silver oxide (which was freshly prepared from 15 parts of silver nitrate), in 50 parts of water and the mixture was shaken for some hours at room temperature. Filtration is followed by acidification and ether extraction gave a solution from which by evaporation of ether and fractional distillation of the residual oil in vacuo alpha-methyl-tertiary-butyl acrylic acid was isolated as a colourless oil with a boiling point of 120–125° C./15 mm. Hg, and a refractive index $n_D^{20}$ of 1.455.

When this acid is hydrogenated in a similar manner as described for alpha-neopentyl acrylic acid the same 2:4:4-trimethyl-pentanoic acid results.

We claim:

1. A process for the manufacture of alpha-neopentyl-acrolein and alpha-methyl beta-tertiary-butylacrolein which comprises reacting di-isobutene in the vapour phase at elevated temperatures in the range between 200 and 400° C. with molecular oxygen in the presence in the reaction zone of elementary selenium and a solid oxidation catalyst selected from the group consisting of copper, an oxide of copper, copper chloride, sulphate, aluminate, chromite, chromate, molybdate, tungstate and vanadate.

2. Process according to claim 1 wherein the diisobutene is 2:4:4-trimethylpent-1-ene and the alpha-neopentyl-acrolein which is the main product resulting from the oxidation reaction is isolated from the reaction mixture by separation from unreacted di-isobutene, and the methacrolein and isomeric alpha-methyl beta-tertiary butyl acrolein also produced.

3. Process according to claim 1 wherein the di-isobutene is 2:4:4-trimethylpent-2-ene and the alpha-methyl beta-tertiary-butyl-acrolein resulting from the oxidation reaction is isolated from the reaction mixture by separation from unreacted diisobutene and the methyl acrolein and isomeric alpha-neopentylacrolein also produced.

4. Process according to claim 1, wherein the temperature is between 250 and 350° C.

5. Process according to claim 1, wherein the copper containing contact substances are distributed upon a carrier.

6. Process according to claim 1, wherein the elementary selenium is added in the form of vapour to the mixture of the reactant gases.

References Cited in the file of this patent

UNITED STATES PATENTS

| Number | Name | Date |
| --- | --- | --- |
| 1,966,157 | Young | July 10, 1934 |
| 2,020,671 | Dreyfus | Nov. 12, 1935 |
| 2,035,189 | Ramage | Mar. 24, 1936 |
| 2,060,267 | Toussaint | Nov. 10, 1936 |
| 2,081,272 | Foster | May 25, 1937 |
| 2,105,284 | Groll et al. | Jan. 11, 1938 |
| 2,137,407 | Lazier | Nov. 22, 1938 |
| 2,153,406 | Bauer | Apr. 4, 1939 |
| 2,194,362 | McCallum | Mar. 19, 1940 |
| 2,212,894 | Allen | Aug. 27, 1940 |
| 2,397,891 | Tuerck | Apr. 2, 1946 |
| 2,456,549 | Weizmann | Dec. 14, 1948 |
| 2,484,500 | Hagemeyer | Oct. 11, 1949 |
| 2,485,989 | Smith | Oct. 25, 1949 |
| 2,486,842 | Hearne et al. | Nov. 1, 1949 |
| 2,495,567 | Carmack | Jan. 24, 1950 |

(Other references on following page)

UNITED STATES PATENTS

| | | |
|---|---|---|
| 2,518,416 | Bortnick | Aug. 8, 1950 |
| 2,549,457 | Gresham | Apr. 17, 1951 |
| 2,593,437 | Goodings et al. | Apr. 22, 1952 |
| 2,670,380 | Hadley | Feb. 23, 1954 |

FOREIGN PATENTS

| | | |
|---|---|---|
| 173,737 | Switzerland | Dec. 15, 1934 |

OTHER REFERENCES

Rupe et al.: Chem. Abstracts, vol. 23, page 1614 (1929).

Berkman et al.: Catalysis, Reinhold Publishing Corp., New York (1940).

Gilman Organic Chemistry, John Wiley & Sons, New York (1943), vol. 1, pages 59–62.

UNITED STATES PATENT OFFICE
Certificate of Correction

Patent No. 2,810,763 October 22, 1957

David James Hadley et al.

It is hereby certified that error appears in the printed specification of the above numbered patent requiring correction and that the said Letters Patent should read as corrected below.

Column 1, line 55, for "cooper" read —copper—; column 4, in the reaction scheme at the top of the page, the following names should be underscored:

<u>(α-neopentyl-acrolein)</u>
<u>(α-methyl β-tertiary butyl-acrolein)</u>
<u>(α-neopentyl acrylic acid)</u>
<u>(2:4:4-trimethyl pent-2-enoic acid)</u>

Signed and sealed this 18th day of February 1958.

[SEAL]

Attest:
KARL H. AXLINE,
*Attesting Officer.*

ROBERT C. WATSON,
*Commissioner of Patents.*